US009558564B1

(12) United States Patent
Korchev et al.

(10) Patent No.: US 9,558,564 B1
(45) Date of Patent: Jan. 31, 2017

(54) METHOD FOR FINDING IMPORTANT CHANGES IN 3D POINT CLOUDS

(71) Applicant: HRL LABORATORIES LLC, Malibu, CA (US)

(72) Inventors: Dmitriy V. Korchev, Irvine, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/701,760

(22) Filed: May 1, 2015

Related U.S. Application Data (60) Provisional application No. 61/988,071, filed on May 2, 2014.

(51) Int. Cl.
*G06K 9/00* (2006.01)
*G06T 7/20* (2006.01)
*G06T 3/00* (2006.01)
*G06K 9/62* (2006.01)

(52) U.S. Cl.
CPC .............. *G06T 7/20* (2013.01); *G06K 9/6212* (2013.01); *G06T 3/0037* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 2012/0281104 A1* | 11/2012 | Ohmiya | ................ | G06T 7/0028 348/208.6 |
| 2014/0340502 A1* | 11/2014 | Freeman | ................... | G06T 7/20 348/79 |
| 2015/0049084 A1* | 2/2015 | Cheng | ..................... | G06T 15/08 345/424 |
| 2015/0305657 A1* | 10/2015 | Lasenby | .............. | A61B 5/1135 600/476 |

OTHER PUBLICATIONS

Jozsa et al., "Towards 4D virtual city reconstruction from Lidar point cloud sequences", ISPRS 2013.*
D. Girardeau-Montaut et al., "Change Detection on Points Cloud Data Acquired With a Ground Laser Scanner", ISPRS WG III/3, III/4, V/3 Workshop Laser Scanning 2005, Enschede, the Netherlands, Sep. 12-14, 2005, pp. 30-35.
Sung-Hyuk Cha, "Comprehensive Survey on Distance/Similarity Measures Between Probability Density Functions", International Journal of Mathematical Models and Methods in Applied Sciences, Issue 4, vol. 1, 2007, pp. 300-307.

* cited by examiner

*Primary Examiner* — Soo Jin Park
(74) *Attorney, Agent, or Firm* — Ladas & Parry (57) ABSTRACT

A motion detector comprising a sensor apparatus and a calculator arranged for: generating first and second successive frames comprising each a 3-D cloud of points, wherein each point represents a position in space of a surface of at least an object in the field of vision of said sensor apparatus; transforming each of the first and second frames by: mapping each cloud of 3-D points into a 2-D grid of cells associated each to a sequence of predetermined volumes; and associating to each cell of the 2-D grid of cells a sequence of the lists of the points contained in corresponding volumes of the sequence of predetermined volumes; comparing the sequences of lists associated to the same cells of the 2-D grids obtained for the first and second frames; and indicating that motion occurred based on the sequence of lists being different in the first and second frames.

28 Claims, 10 Drawing Sheets

METHOD FOR FINDING IMPORTANT CHANGES IN 3D POINT CLOUDS

CROSS REFERENCE TO RELATED APPLICATIONS

The present disclosure claims priority of U.S. provisional application No. 61/988,071, filed on May 2, 2014 and entitled "METHOD FOR FINDING IMPORTANT CHANGES 3D POINT CLOUDS", which is hereby incorporated by reference.

REFERENCE TO A CONTRACT

This disclosure relates to work has been funded by a contact with US Army Engineer Research and Development Center under contract W9132V-13-C-0003.

TECHNICAL FIELD

The present disclosure relates to detection of motion using remote sensing technology, for example such as LIDAR, a remote sensing technology that measures distance by illuminating a target with a light source such as a laser and analyzing the reflected light.

BACKGROUND

Protection of bases, camps, or buildings in hostile environments is a very critical part of military and civilian operations that requires significant amount of security personnel to be deployed around the clock. Any automated electronic sensor based system must have high probability of detections and low false alarm rate to be useful in the presence of natural motion of trees and vegetation caused by wind.

The reference "CHANGE DETECTION ON POINTS CLOUD DATA ACQUIRED WITH A GROUND LASER SCANNER, ISPRS WG III/3, III/4, V/3 Workshop" (Laser scanning 2005", Enschede, the Netherlands, Sep. 12-14, 2005) by D. Girardeau-Montaut, Michel Roux, Raphaël Marc, Guillaume Thibault, relates to the processing and extracting of information from 3D point clouds. However, as mentioned above, such known Electro Optic/Infra Red based systems suffer for example from high false alarm rate and low detection capability in highly vegetated areas.

There exists a need a motion detector that can reliably and robustly detect threats and intrusions with a low false alarm rate in different environments including surrounding trees, vegetation, and other natural landscape features.

SUMMARY OF THE INVENTION

Embodiments of the present disclosure are based on a LIDAR sensor, and can reliably and robustly detect threats and intrusions with a low false alarm rate in different environments including surrounding trees, vegetation, and other natural landscape features. Embodiments of the present disclosure find human activity and human caused changes not only in open spaces but also in heavy vegetated areas.

Embodiments of the present disclosure are applicable to the electronic security applications for protecting military and civilian bases and installations in hostile and dynamic environments. Embodiments of the present disclosure are applicable to programs that utilize 3D point cloud data generated by LIDAR, time-of-flight imagers, laser scanners, stereo imagers, or other sensors for sensing and automated understanding of 3D environments. Embodiments of the present disclosure are applicable to upcoming new commercial, military, and government applications that need intelligent 3D sensing systems.

Embodiments of the present disclosure relate to a novel method for automatic detection of important changes in 3D LIDAR point clouds. Important changes include for example all changes in positions and poses of objects caused by human activity: people, cars, tools, machinery, digging in the ground, construction, demolition and so on. Unimportant changes include for example normal environmental changes caused by moving branches of trees and bushes or motion of leaves in vegetation.

According to an embodiment of the present disclosure, the input data consists of a sequence of point clouds (called frames) produced by a LIDAR scanning a same area at different times.

Embodiments of the present disclosure relate to methods of finding changes in point clouds based on analysis of statistical properties of points mapped into cells of horizontal 2D grids corresponding to each cloud of points.

According to an embodiment of the present disclosure, each frame of the data can comprise a 360 degree LIDAR scan of the area at a given time. A goal of the present disclosure is to find important spatial differences between frames. Every 3D point cloud is first mapped into a 2D horizontal rectangular or nonrectangular grid. Each cell of this grid contains a list of the points that are projected into it. Then each cell is processed to calculate the histogram of the vertical coordinate of the points mapped into it. The spatial differences are detected by comparing the height histograms of corresponding cells in different frames: a current frame and a reference one. Additional improvements can be achieved by taking into considerations the ground locations at each cell of the grid. This is accomplished either by reconstructing the ground plane from the sequence of input data or from a pre-scanned point cloud of the area under surveillance. The history of frames and/or pre-scanned point cloud of the area can also be exploited for the improvement of the robustness of the algorithm.

Embodiments of the present disclosure relate to a motion detector comprising: a sensor apparatus having a field of vision; and a calculator arranged for: generating first and second successive frames each comprising a 3-D cloud of points, wherein each point represents a position in space of a surface of at least an object in the field of vision of said sensor apparatus; transforming each of the first and second frames by: mapping each cloud of 3-D points into a 2-D grid of cells, each cell of the 2-D grid having a predetermined surface and each 2-D grid cell being associated to a sequence of predetermined volumes; and associating to each cell of the 2-D grid of cells a sequence of lists of points, each list comprising the 3-D points contained in a corresponding volume of said sequence of predetermined volumes; comparing the sequences of lists associated to the same cells of the 2-D grids obtained for the first and second frames; and indicating that motion occurred based on the sequence of lists being different in the first and second frames.

According to embodiments of the present disclosure, said calculator is arranged for comparing the sequences of lists associated to the same cells of the 2-D grids obtained for the first and second frames by: generating for each cell of the 2-D grid a histogram comprising as many entries as there are lists in the sequence of lists associated to the cell, each entry being the number of points in the list; and comparing the histograms generated for each cell for the first and second frames.

According to embodiments of the present disclosure, the calculator is arranged for comparing the histograms by calculating a distance between the histograms, the sequences of lists associated to the same cells of the 2-D grids obtained for the first and second frames being different if the distance between their histograms is greater than a predetermined threshold.

According to embodiments of the present disclosure, the calculator is arranged for marking the cells of the first and second 2-D grids having histograms distant by more than said predetermined threshold.

According to embodiments of the present disclosure, the calculator is arranged for comparing in priority the sequence of lists associated to the 2-D grid cells proximal to the sensor apparatus; the calculator is arranged for marking the cells of the first and second 2-D grids having different sequence of lists for the first and second frames; and the calculator is arranged for considering as identical the sequences of lists associated to the 2-D grid cells located in a shadow zone of any marked cell, the shadow zone comprising an area of the 2-D grid expanding from the marked cell, away from the sensor apparatus, between two lines originating at the sensor apparatus and being tangent with the marked cell.

According to embodiments of the present disclosure, the calculator is arranged for displaying one of the first and second frames with a highlighting of the points of the lists that differ from the corresponding lists in the other frame.

According to embodiments of the present disclosure, the calculator is arranged for considering two compared sequences of lists as identical if each of the compared sequences of lists comprises less than a first predetermined minimum number of points.

According to embodiments of the present disclosure, the calculator is arranged for considering two compared sequences of lists as identical if: at least one of the compared sequences of lists comprises less than a second predetermined minimum number of points; and the largest of the compared sequence of lists comprises less than a third predetermined minimum number of points.

According to embodiments of the present disclosure, the calculator is arranged for considering a sequence of lists associated to a cell of the 2-D grid of cells as empty if at least a predetermined number of the lists comprise each less points than a fourth predetermined minimum number of points.

According to embodiments of the present disclosure, the calculator is arranged for considering a sequence of lists associated to a cell of the 2-D grid of cells as empty if the sequence comprises less than a predetermined minimum number of consecutive non-empty lists.

According to embodiments of the present disclosure, said predetermined volumes associated to a 2-D grid cell are all located below a predetermined height over said cell.

According to embodiments of the present disclosure, a height of a ground surface in the field of view of the sensor is known for each cell of the 2-D grid, and said predetermined height defines a predetermined space above said ground plane.

According to embodiments of the present disclosure, the sensor apparatus is one of a LIDAR sensor, an ultrasound sensor, a radar sensor, a sonar sensor and an RFID sensor.

Embodiments of the present disclosure also relate to a method for detecting motion, the method comprising: providing a sensor apparatus having a field of vision; generating first and second successive frames comprising each a 3-D cloud of points, wherein each point represents a position in space of a surface of at least an object in the field of vision of said sensor apparatus; transforming each of the first and second frames by: mapping each cloud of 3-D points into a 2-D grid of cells, each cell of the 2-D grid having a predetermined surface and each 2-D grid cell being associated to a sequence of predetermined volumes; and associating to each cell of the 2-D grid of cells a sequence of lists of points, each list comprising the 3-D points contained in a corresponding volume of said sequence of predetermined volumes; comparing the sequences of lists associated to the same cells of the 2-D grids obtained for the first and second frames; and indicating that motion occurred based on the sequences of lists being different in the first and second frames.

According to embodiments of the present disclosure, said comparing the sequences of lists associated to the same cells of the 2-D grids obtained for the first and second frames comprises: generating for each cell of the 2-D grid a histogram comprising as many entries as there are lists in the sequence of lists associated to the cell, each entry being the number of points in the list; and comparing the histograms generated for each cell for the first and second frames.

According to embodiments of the present disclosure, comparing the histograms comprises calculating a distance between the histograms, the sequences of lists associated to the same cells of the 2-D grids obtained for the first and second frames being different if the distance between their histograms is greater than a predetermined threshold.

According to embodiments of the present disclosure, indicating that motion occurred based on the lists of points being different in the first and second frames comprises marking the cells of the first and second 2-D grids having histograms distant by more than said predetermined threshold.

According to embodiments of the present disclosure, said comparing comprises comparing in priority the sequence of lists associated to the 2-D grid cells proximal to the sensor apparatus; and the method comprises: marking the cells of the first and second 2-D grids having different sequence of lists for the first and second frames; and considering as identical the sequences of lists associated to the 2-D grid cells located in a shadow zone of any marked cell, the shadow zone comprising an area of the 2-D grid expanding from the marked cell, away from the sensor apparatus, between two lines originating at the sensor apparatus and being tangent with the marked cell.

According to embodiments of the present disclosure, said indicating that motion occurred based on the sequence of lists being different in the first and second frames comprises displaying one of the first and second frames with a highlighting of the points of the lists that differ from the corresponding lists in the other frame.

According to embodiments of the present disclosure, said comparing the sequences of lists associated to the same cells of the 2-D grids obtained for the first and second frames comprises: considering two compared sequences of lists as identical if each of the compared sequences of lists comprises less than a first predetermined minimum number of points.

According to embodiments of the present disclosure, said comparing the sequences of lists associated to the same cells of the 2-D grids obtained for the first and second frames comprises: considering two compared sequences of lists as identical if: at least one of the compared sequences of lists comprises less than a second predetermined minimum number of points; and the largest of the compared sequence of lists comprises less than a third predetermined minimum number of points.

According to embodiments of the present disclosure, said comparing the sequences of lists associated to the same cells of the 2-D grids obtained for the first and second frames comprises: considering a sequence of lists associated to a cell of the 2-D grid of cells as empty if at least a predetermined number of the lists comprise each less points than a fourth predetermined minimum number of points.

According to embodiments of the present disclosure, said comparing the lists of points associated to the same cells of the 2-D grids obtained for the first and second frames comprises: considering a sequence of lists associated to a cell of the 2-D grid of cells as empty if the sequence comprises less than a predetermined minimum number of consecutive non-empty lists.

According to embodiments of the present disclosure, said predetermined volumes associated to a 2-D grid cell are all located below a predetermined height over said cell.

According to embodiments of the present disclosure, a height of a ground surface is known for each cell of the 2-D grid, and said predetermined height defines a predetermined space above said ground plane.

According to embodiments of the present disclosure, the sensor apparatus is one of a LIDAR sensor, an ultrasound sensor, a radar sensor, a sonar sensor and an RFID sensor.

An embodiment of the present disclosure also relates to a computer medium storing computer instructions which, when executed by a computer, cause the computer to: receive, from a sensor apparatus having a field of vision, first and second successive frames comprising each a 3-D cloud of points, wherein each point represents a position in space of a surface of at least an object in the field of vision of said sensor apparatus; transform each of the first and second frames by: mapping each cloud of 3-D points into a 2-D grid of cells, each cell of the 2-D grid having a predetermined surface and each 2-D grid cell being associated to a sequence of predetermined volumes; and associating to each cell of the 2-D grid of cells a sequence of lists of points, each list comprising the 3-D points contained in a corresponding volume of said sequence of predetermined volumes; compare the lists of points associated to the same cells of the 2-D grids obtained for the first and second frames; and indicate that motion occurred based on the lists of points being different in the first and second frames.

According to embodiments of the present disclosure, said comparing the lists of points associated to the same cells of the 2-D grids obtained for the first and second frames comprises: generating for each cell of the 2-D grid a histogram comprising as many entries as there are lists in the sequence of lists associated to the cell, each entry being the number of points in the list; and comparing the histograms generated for each cell for the first and second frames.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
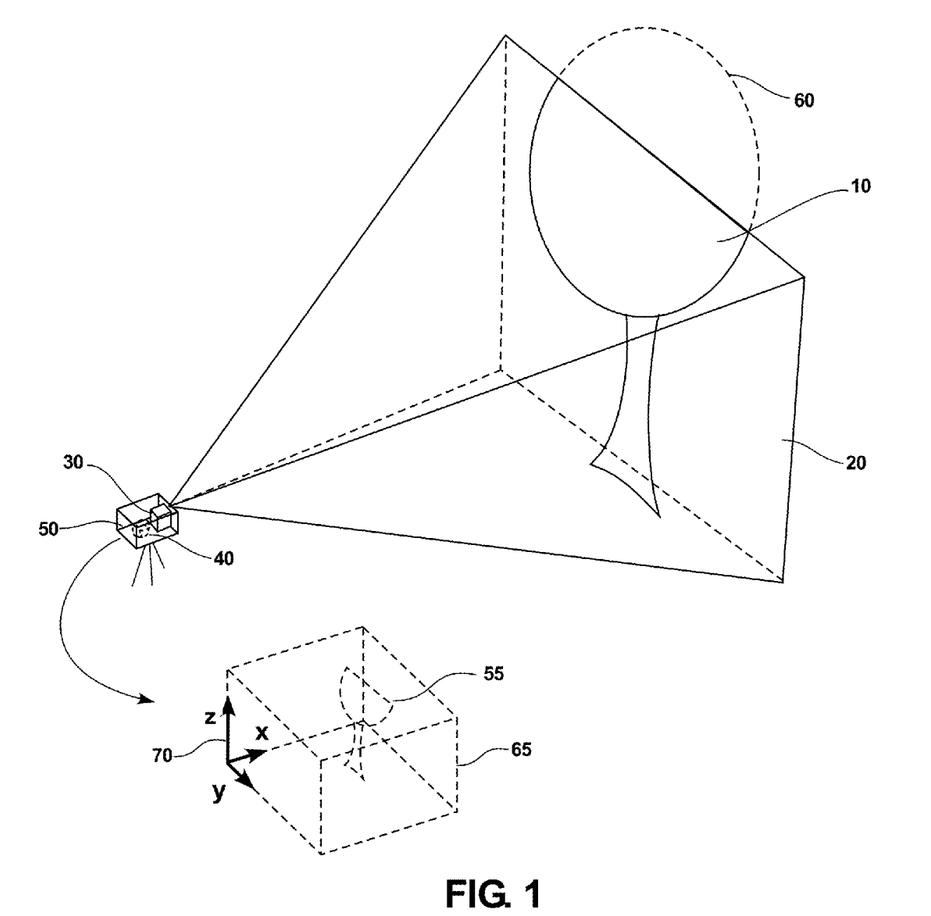
FIG. 1 illustrates the acquisition of a 3-D cloud of points according to an embodiment of the present disclosure.

FIG. 1 shows an elevation view of an object, such as a tree 10, located in a field of view 20 of a sensor apparatus 30. Sensor apparatus 30, which can according to an embodiment of the present disclosure be a LIDAR sensor, is coupled to a calculator 40 that can be arranged in a same housing 50 as sensor apparatus 30. According to an embodiment of the present disclosure, calculator 40 can alternatively be arranged remotely from apparatus 30 and housing 50. Calculator 40 is arranged for generating, from the output of sensor apparatus 30, a frame or 3-D cloud of points 55, wherein each point represents the position in space of a surface of object 10 in the field of vision of sensor apparatus 30. Housing 50 can be located close to the ground or it can be mounted on an elevated platform or on a mast.

Surfaces of portions 60 of object 10 that are not in the field of vision of sensor apparatus 30 do not form part of cloud of points 55. Cloud of points 55 comprises only points corresponding to the surfaces of object 10 directly visible from sensor apparatus 30. Any portion of object 10 not directly visible from sensor apparatus 30 is not used to form cloud of points 55. Cloud of points 55 thus forms a 3-D outer shell image of the portions of object 10 visible from sensor apparatus 30.

Figure 1A:
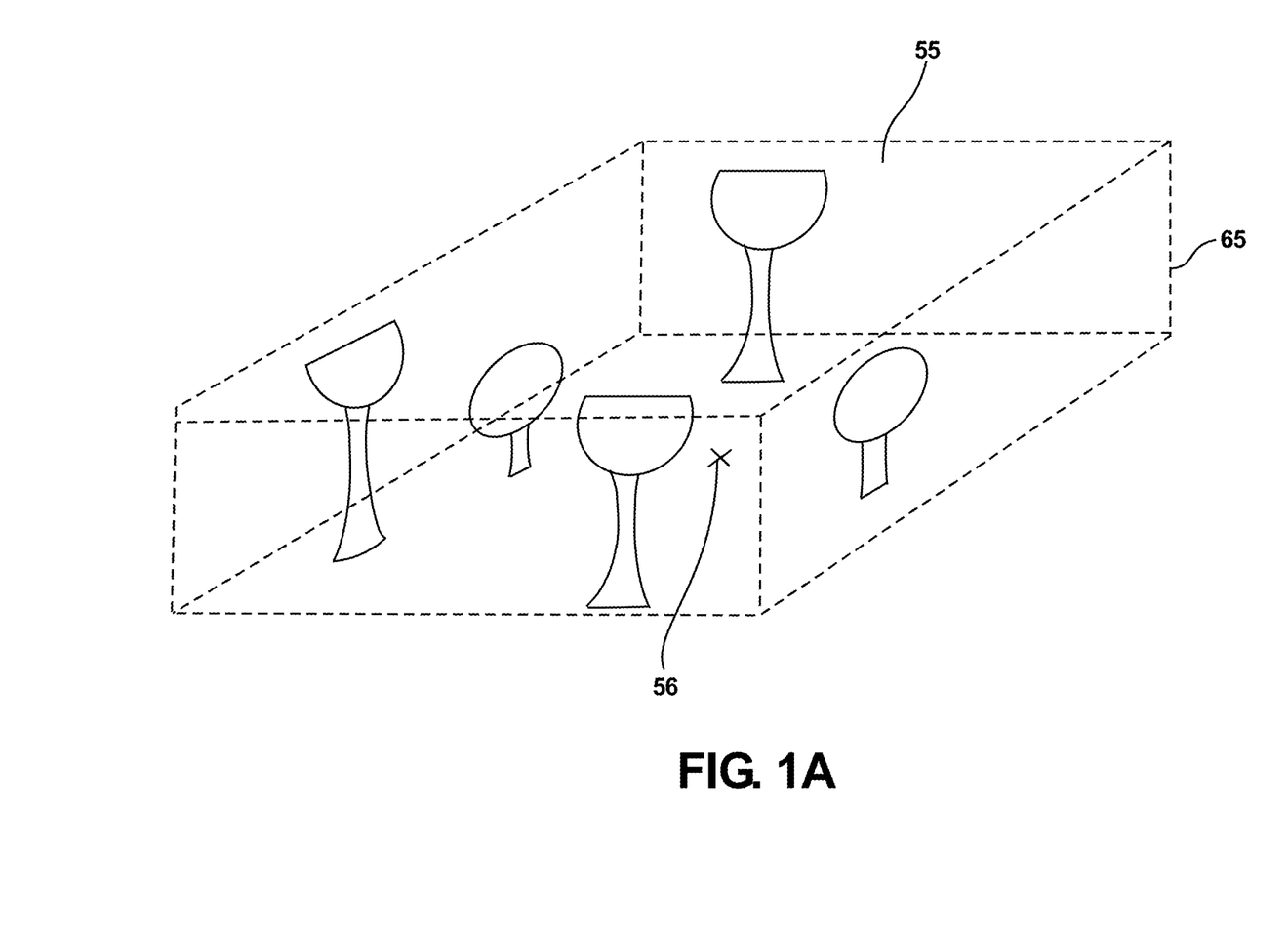
FIG. 1A illustrates a 3-D cloud of points according to an embodiment of the present disclosure.

For clarity of illustration, cloud of points 55 is shown in FIG. 1 as having parallelepipedic boundaries 65, wherein each point of cloud of points 55 can be identified by a set of Cartesian coordinates in a Cartesian referential 70. According to embodiments of the disclosure, cloud of points 55 can be formed by a sensor apparatus 30 having a fixed field of vision, as illustrated in FIG. 1. According to embodiments of the disclosure, cloud of points 55 can be formed by a sensor apparatus 30 having a mobile field of vision, for example by having sensor apparatus 30 rotate around a vertical axis (not shown). Where cloud of points 55 is formed by a sensor apparatus 30 that rotates around a vertical axis, the center 56 of the cloud of points 55 is the location of sensor apparatus 30, as illustrated in FIG. 1A.

According to embodiments of the disclosure, the position in space of each point of cloud 55 can be acquired in a spherical referential centered on the sensor apparatus 30, in which case each point can for example be identified by a distance from the sensor and a solid angle with respect to an axis of vision of the sensor. The position of each point can also be acquired in or transformed into a 3D Cartesian coordinate system.

Figure 2:
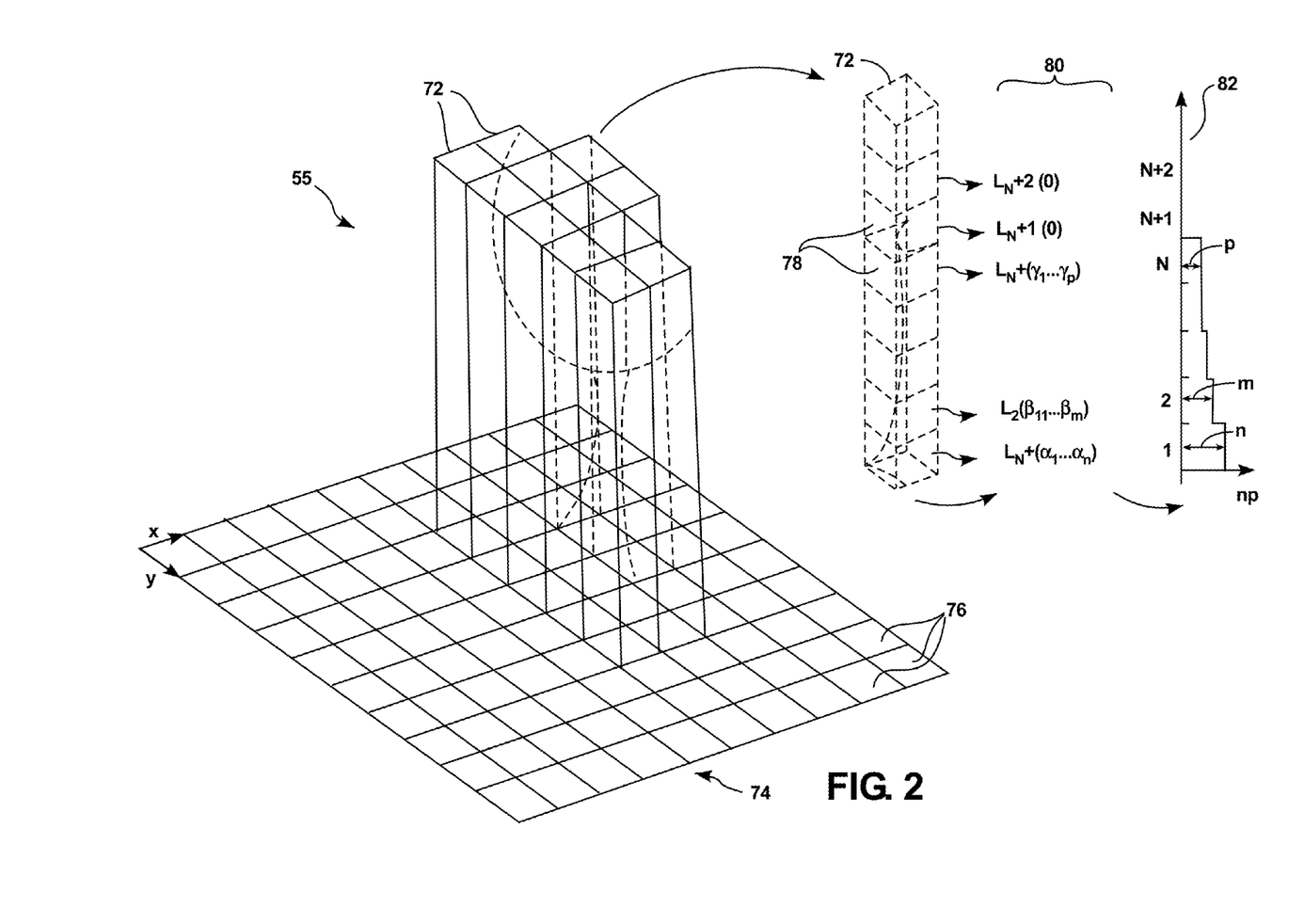
FIG. 2 illustrates the transformation of a portion of the 3-D cloud of points of FIG. 1 according to an embodiment of the present disclosure.

FIG. 2 illustrates the transformation of 3D cloud of points 55 according to an embodiment of the present disclosure. According to an embodiment of the present disclosure, cloud of points 55 is segmented into a set of juxtaposed volume cells 72 having fixed lateral dimensions and the same height as the cloud of points 55. According to an embodiment of the present disclosure, each volume cell 72 can have a square horizontal cross-section, wherein the sum of the horizontal cross-sections of the volume cells 72 form a horizontal 2D grid 74 comprised of juxtaposed surface cells 76. It is to be noted that in other embodiments of the present disclosure, the different volume cells 72 can each have different horizontal cross-sections, and/or can have cross sections that are not square (such as triangular or hexagonal).

As illustrated in FIG. 2, according to an embodiment of the present disclosure, each volume cell 72 is segmented into a plurality of sub-volumes, or "bins" 78, having the same horizontal cross-section as volume cell 72, but having a pre-determined height and thus corresponding to a predetermined volume within volume cell 72. According to an embodiment of the present disclosure, the height of a bin can be of 20 centimeter. Each volume cell 72 thus forms a sequence of bins 78. According to an embodiment of the present disclosure, each bin 78 can be associated to a list L of the 3-D points it contains. According to an embodiment of the disclosure, calculator 40 is arranged to map 3-D cloud 55 into a 2-D grid 74 of surface cells 76, each surface cell 76 of the 2-D grid 74 having a predetermined surface and each surface cell 76 being associated to a sequence (forming corresponding volume cell 72) of predetermined volumes or bins 78. According to an embodiment of the disclosure, calculator 40 is arranged to associate each surface cell 76 of the 2-D grid 74 to a sequence 80 of lists L comprising, for each bin 78 of the volume cell 72 corresponding to surface cell 76, the list of the 3-D points of cloud 55 that are contained in bin 78.

FIG. 2 shows for illustration purpose a sequence 80 of lists $L_1, L_2, \ldots L_{N+2}, \ldots$ associated to a volume cell 72, wherein: List $L_1$ lists the points $\alpha1, \alpha2, \ldots \alpha n$ of cloud 55 comprised in a first bin 78 of volume cell 72; List L2 lists the points $\beta1, \beta2, \ldots \beta m$ of cloud 55 comprised in a second bin 78 of volume cell 72; . . . and List $L_N$ lists the points $\gamma1, \gamma2, \ldots \gamma p$ of cloud 55 comprised in a Nth bin 78 of volume cell 72. In the exemplary sequence 80, list $L_{N+1}$ and above are empty because they correspond to volumes/bins 78 of cloud 55 that comprise no points. In the exemplary embodiment of cloud 55 being formed by the visible surfaces of a tree 10, as shown in FIG. 1, lists $L_1, L_2, \ldots L_N$ list the points of the trunk of tree 10 that are visible from sensor 30 and comprised in volume cell 72. Lists $L_{N+1}, L_{N+2}, \ldots$ correspond to volumes within the foliage of tree 10, which were hidden from the sensor 30 by the foliage, and that are therefore empty of points. The sequence 80 is for illustrative purpose. The real foliage of a tree may have gaps, whereby the cloud of points would comprise points corresponding to surfaces sensed by sensor 30 through the gaps of the foliage.

According to an embodiment of the present disclosure, calculator 40 is arranged for generating for each surface cell 76 of the 2-D grid a histogram 82 comprising as many entries as there are lists L in the sequence 80 of lists associated to the surface cell 76, each entry having a value equal to the number of points in the list L. The histogram 82 illustrated in FIG. 2 thus shows a number of entries of value np varying step by step with respect to a height z. In FIG. 2 the height dimension of each step corresponds to the height of the bins of volume cell 72. In FIG. 2, the first entry of histogram 82 has the value n, which is the number of points in list $L_1$; the second entry of histogram 82 has the value m, which is the number of points in list $L_2$, . . . and the Nth entry of histogram 82 has the value p, which is the number of points in list $L_N$. The smaller the bins 78, the more entries histogram 82 comprises.

Figure 3:
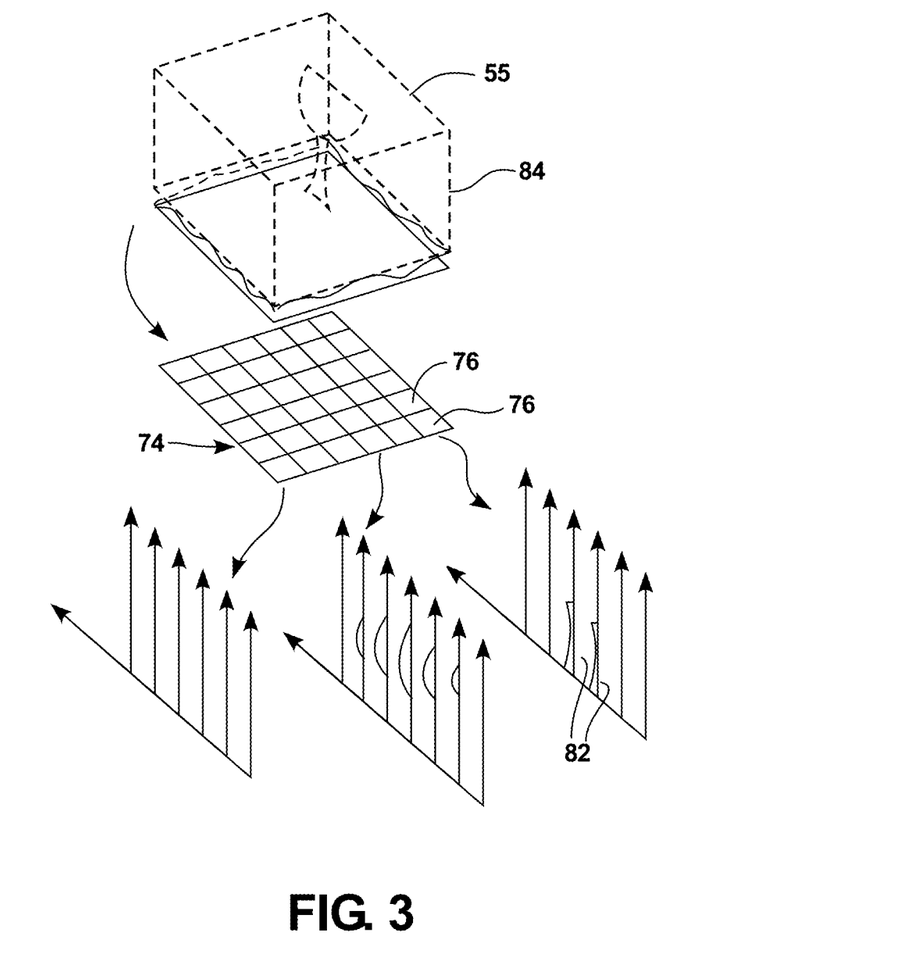
FIG. 3 illustrates the transformation of the 3-D cloud of points of FIG. 1 according to an embodiment of the present disclosure.

FIG. 3 summarizes the transformations calculator 40 conducts on 3D cloud of points 55 according to an embodiment of the present disclosure. Calculator 40 maps 3-D cloud 55 into a 2-D grid 74 of surface cells 76, each surface cell 76 of the 2-D grid 74 having a predetermined surface and each surface cell 76 being associated to a volume cell 72 (not shown on FIG. 3) comprising predetermined volumes or bins 78 (not shown on FIG. 3). According to an embodiment of the disclosure, calculator 40 is arranged to associate each surface cell 76 of the 2-D grid 74 to a sequence 80 of lists L (not shown) comprising, for each bin 78 of the volume cell 72 corresponding to surface cell 76, the list of the 3-D points of cloud 55 that are contained in bin 78. According to an embodiment of the disclosure, calculator 40 is arranged for generating for each surface cell 76 a histogram 82 comprising as many entries as there are lists L in the sequence 80, each entry having a value equal to the number of points in the list L. For clarity, the histograms 82 are schematically illustrated as continuous curves. In practice however, histograms 82 are comprised of a sequence of discrete entries, as detailed above in relation with FIG. 2.

For illustrative purpose, FIG. 3 shows that cloud of points 55 may comprise only points above a ground surface 84. According to an embodiment of the disclosure (not shown), cloud of points 55 can also comprise points from the ground surface, depending for example on the field of view of sensor apparatus 30. According to an embodiment of the disclosure (not shown), the field of view of sensor apparatus 30 may be arranged such that cloud of points 55 comprises points from the ground surface, and calculator 40 may be arranged to not take into account points from the ground surface, and/or points below a certain height, and/or points above a certain height.

Figure 4:
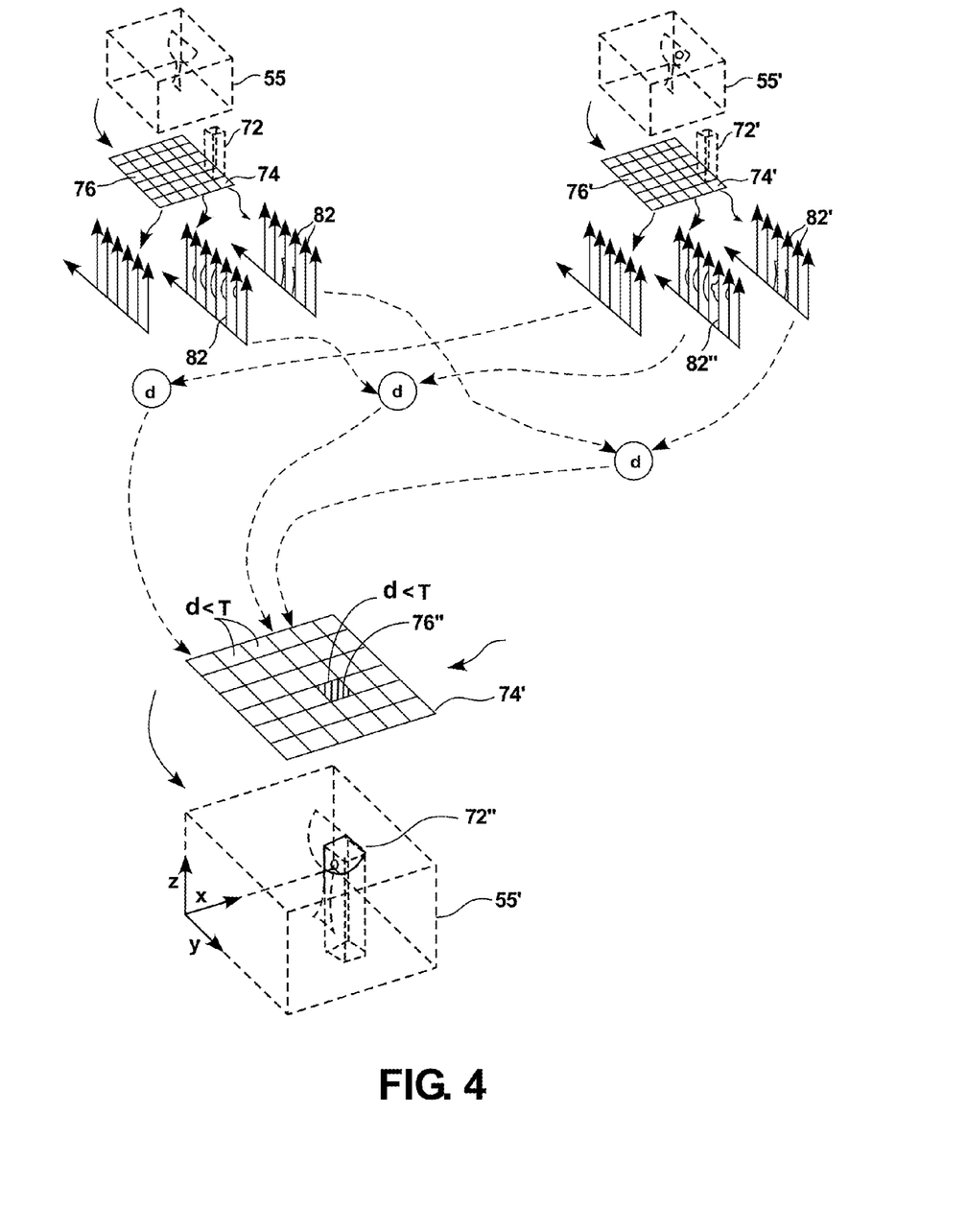
FIG. 4 illustrates the detection of a motion based on the transformation of first and second 3D clouds of points, according to an embodiment of the present disclosure.

FIG. 4 illustrates the detection of a motion according to an embodiment of the present disclosure, based on the histograms 82 formed by calculator 40 for the cells 76 associated to two successive clouds of points 55 and 55'. According to an embodiment of the present disclosure, calculator 40 generates from the output of sensor apparatus 30 a first cloud of points 55 at a given time and a second cloud of points 55' at a subsequent time. The successive frames or point of clouds 55, 55' can for example be generated with a predetermined periodicity. Such periodicity can for example range from one second to a few minutes.

As detailed above, calculator 40 transforms each of the first cloud 55 and second cloud 55' cloud by mapping it into first and second 2-D grids of surface cells 74, 74', and associates to each surface cell 76, 76' of the grids 74, 74' a list of points (not shown) and then a histogram 82, 82' derived from the list of points. According to an embodiment of the present disclosure, the histogram 82, 82' associated to each surface cell 76, 76' shows the number of cloud points per determined unit of volume (bin 78) above the surface cell 76, 76'.

According to an embodiment of the present disclosure, calculator 40 compares the sequences of lists associated to the same surface cells 76, 76' of the 2-D grids 74, 74' obtained for the first and second clouds of points 55, 55'; for example by comparing the histograms 82, 82' generated for the same surface cells 76, 76' for the first and second cloud of points 55, 55'. According to an embodiment of the present disclosure, calculator 40 is arranged for indicating that motion occurred if the sequences of lists obtained for a same location in clouds of points 55, 55' are different. According to an embodiment of the disclosure, calculator 40 is arranged for indicating that motion occurred if histograms 82, 82' obtained for a same location in clouds of points 55, 55', are different. For example, calculator 40 can mark the cells 76, 76' of the first and/or second 2-D grids 74, 74' having histograms 82, 82' distant by more than a predetermined distance threshold.

FIG. 4 illustrates calculator 40 having marked a cell 76" of 2-D grid 74', obtained for cloud of points 55', which corresponds to a histogram 82" that differs by more than a predetermined distance threshold from the histogram 82 of the same cell 76 of the grid 74 obtained for the cloud of points 55. According to an embodiment of the present disclosure, calculator 40 is arranged for comparing the histograms 82 and 82' by calculating a distance, such as a Bhattacharyya distance, between the histograms.

For example, the distance d(H1,H2) between two histograms H1, H2 having a number N of entries or bins can be calculated as:

$$d(H_1, H_2) = \sqrt{1 - \frac{1}{\sqrt{\overline{H_1}\overline{H_2}N^2}} \sum_I \sqrt{H_1(I) \cdot H_2(I)}}$$

According to an embodiment of the present disclosure, if the distance between two compared histograms is greater than a specified threshold T the calculator marks the cells as different. According to an embodiment of the present disclosure, the specified threshold can be 0.7.

Other popular methods for histogram comparison include Earth Mover Distance (EMD), Chi-square. In addition, comparisons can be performed using various types of moments calculated for the histograms. The document "Comprehensive Survey on Distance/Similarity Measures between Probability Density", by Sung-Hyuk Cha (Functions, International Journal of Mathematical Models and Methods, Issue 4, Volume 1, 2007) discloses other methods to compare a distance between two histograms.

According to embodiments of the present disclosure, calculator 40 compares the histograms 82 and 82' representing the points in the bins of volume cells 72 and 72' from points of clouds 55 and 55'. If differences are found between the compared histograms (for example if the distance between the two compared histograms is larger than a predetermined threshold), the surface cells 76 and 76' corresponding to the volume cells 72 and 72' are marked as cells having differences and a motion is detected in these cells. According to an embodiment of the present disclosure, the locations of surface cells having differences are clustered on at least one of the 2D grids 74 and 74' and can be labeled. The coordinates of the clusters of cells having differences can then be provided as an output of the calculator 40.

FIG. 4 shows schematically calculator 40 displaying clouds 55' with a highlighting of the points in a volume cell 72" corresponding to a histogram 82" found different from the histogram 82 relative to the same volume cell in previous cloud of points 55. FIG. 4 is schematic and in practice clusters of volume cells 72 corresponding to marked surface cells 76 can be displayed and/or highlighted by calculator 40.

Figure 5:
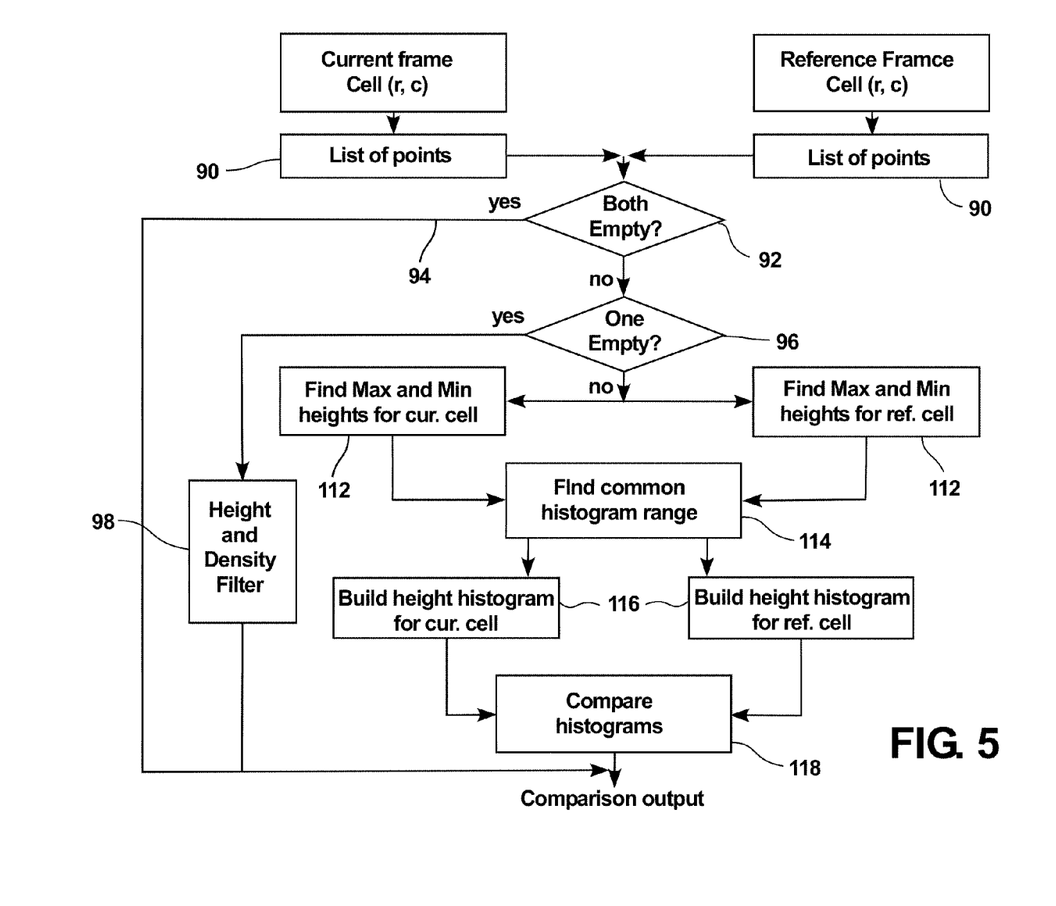
FIG. 5 illustrates the operation of the calculator of FIG. 1 for comparing corresponding volume cells of the first and second 3D clouds of points.

FIG. 5 details the operation of calculator 40 according to an embodiment of the present disclosure, for comparing the sequences of lists of points corresponding to two volume cells 72', 72, respectively from a current frame (such as cloud of points 55' in FIG. 4) and a reference frame (such as cloud of points 55 in FIG. 4).

First, calculator 40 constructs 90 a vector, or list, containing the height (the coordinate of the points in the Z direction) of the points in both current volume cell 72' and reference cell 72:

$$h^{cur}(r,c) = [h_1^{cur}, h_2^{cur}, \ldots, h_n^{cur}]; \text{ and}$$

$$h^{ref}(r,c) = [h_1^{ref}, h_2^{ref}, \ldots, h_m^{ref}],$$

where n is the number of points in current volume cell 72' and m the number of points in reference volume cell 72, r is the row number of volume cells 72, 72' in grids 74, 74'; and c is the column number of volume cells 72, 72' in grids 74, 74'.

Next, calculator 40 checks 92 if both vectors $h^{cur}(r,c)$ and $h^{ref}$ contain more points than specified by a predetermined parameter "min_points_in_cell". According to an embodiment of the present disclosure, a typical value for parameter "min_points_in_cell" is 25.

If n<"min_points_in_cell" and m<"min_points_in_cell", then calculator 40 determines 94 that both volume cells 72', 72 are empty, and marks the corresponding surface cells 76', 76 of grids 74, 74' at row r and column c as comprising no differences; and proceeds to a next pair of cells.

If one of the conditions n<"min_points_in_cell" and m<"min_points_in_cell" is not met, then calculator 40 proceeds to check 96 if one of the current or reference volume cell, 72', 72, contains less points than a second predetermined parameter "second_min_points_in_cell". According to an embodiment of the present disclosure, a typical value for the parameter "second_min_points_in_cell" is 1.

Figure 6:
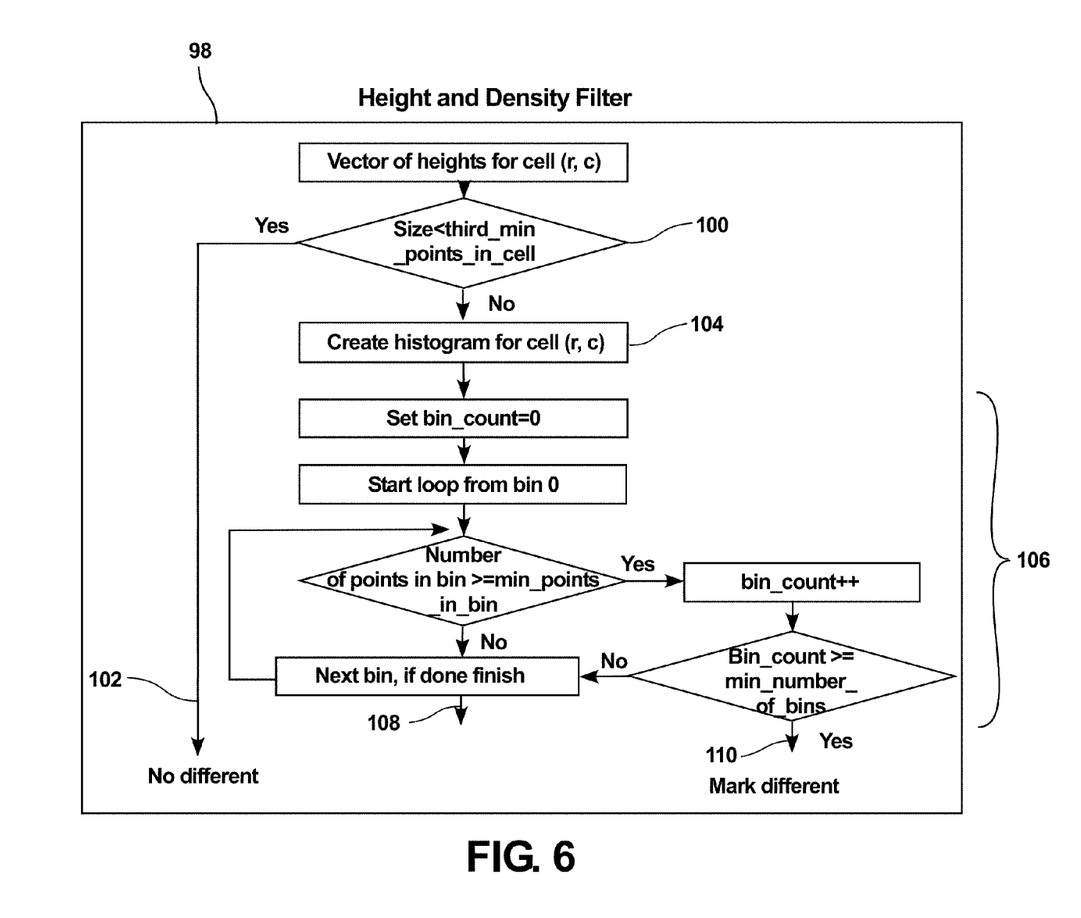
FIG. 6 illustrates a detail of the operation of FIG. 5.

If n<="second_min_points_in_cell" or m<="second_min_points_in_cell", then calculator 40 applies to the one of cells 72, 72' that contains the more points a Height and Density Filter 98 as detailed hereafter in relation with FIG. 6.

FIG. 6 details the operation of calculator 40 applying a height and density filter 98 according to an embodiment of the present disclosure:

First, calculator 40 checks 100 if the cell (the compared cell having the more points, as detailed above) comprises less points than a predetermined parameter "third_min_points_in_cell". According to an embodiment of the present disclosure, a typical value for the parameter "third_min_points_in_cell" is 5. If the cell has less points than "third_min_points_in_cell", then calculator 40 marks 102 the cells of grids 74, 74' at row r and column c as comprising no differences, and proceeds to a next pair of cells.

If the cell has more points than "third_min_points_in_cell", then calculator 40 creates 104 a histogram of the cell, and determines 106 if the histogram comprises at least a predetermined number "min_height_in_bins" of consecutive non-empty entries/bins. According to an embodiment of the disclosure, a non-empty bin is defined as a bin that has a number of points greater or equal to "min_number_of_points_in_bin". A value for "min_number_of_points_in_bin" can be 5.

If the histogram comprises less than the number "min_height_in_bins" of consecutive non-empty entries/bins, calculator 40 marks 108 the cells 76', 76 of grids 74, 74' at row r and column c as comprising no differences, and proceeds to a next pair of current and reference cells. Otherwise, calculator 40 marks 110 the cells 76', 76 of grids 74, 74' at row r and column c as comprising differences, and proceeds to a next pair of current and reference cells. A typical value for "min_height_in_bins" can be 4, in particular if the height of the bins of the vertical cells is of about 20 cm, wherein 4 consecutive non empty bin correspond to 80 cm high.

Returning to FIG. 5, if none of the conditions n<="second_min_points_in_cell" and m<="second_min_points_in_cell" is met, then calculator 40 proceeds to forming histograms 82, and 82 for the volume cells 72', 72 at row r and column c. Calculator 40 first proceeds to finding the common range to be used for histograms 82' and 82.

According to an embodiment of the present disclosure, calculator 40 is provided for constructing histograms 82', 82 having a common range and same number of bins for the current and reference cells 72' and 72. Since points in the corresponding cells 72' and 72 may have different max and min heights, the range of the histograms needs to be aligned to allow the comparison of the histograms. In order to determine the range of the histograms, calculator 40 finds 112 the min and max heights $H_{min}(r,c)$, $H_{max}(r,c)$ of the points in the corresponding cells as:

$$H_{min}(r,c) = \min(H_{min}^{cur}(r,c), H_{min}^{ref}(r,c)); \text{ and } H_{max}(r,c) = \max(H_{max}^{cur}(r,c), H_{max}^{ref}(r,c))$$

where $H_{min}(r,c)$ and $H_{max}(r,c)$ are the min and max heights of the points for both current volume cell 72' and reference volume cell 72;

$H_{min}^{cur}(r,c)$, $H_{min}^{ref}(r,c)$ are min heights of both current and reference cells, and $H_{max}^{cur}(r,c)$, $H_{max}^{ref}(r,c)$ are max heights for both current and reference cells.

Calculator 40 then calculates 114 the range $R_{r,c}$ of the histograms 82', 82 for the cells 72', 72 located at row r and column c as being:

$$R_{r,c} = [H_{min}(r,c), H_{max}(r,c)].$$

Calculator 40 then constructs 116 histograms 82' and 82 in the range $R_{r,c}$, and compares 118 histograms 82' and 82 by measuring the distance between histograms 82' and 82, as detailed above.

It is noted that instead of constructing the histograms 82' and 82 in the range $R_{r,c}$, calculator 40 can construct histograms 82' and 82 in a fixed predetermined range and add a null value for each bin comprising no points (or fewer than a threshold number of points) on the sides of the histograms.

According to an embodiment of the present disclosure, before comparing 118 histograms 82' and 82, the calculator 40 first determines if more than a predetermined number of bins in both histograms 82, 82' comprises less than a predetermined parameter "min________". If this is the case (if too many bins are too small), calculator 40 marks the cells of grids 74, 74' at row r and column c as comprising no differences, and proceeds to a next pair of cells.

According to an embodiment of the present disclosure, if less than said predetermined number of bins in histograms 82, 82' comprises less than "min_number_of_points_in_bin", calculator 40 checks that the bins in histograms 82', 82 relate to points having a height greater than a specified height (so that changes are detected only above a minimum height in the point of clouds).

If this is not the case (if the bins are all under said specified height), calculator 40 marks the cells of grids 74, 74' at row r and column c as comprising no differences, and proceeds to a next pair of cells. Otherwise, calculator 40 proceeds with comparing 118 histograms 82' and 82 by measuring the distance between histograms 82' and 82, as detailed above.

Histograms 82', 82 can comprise at least two groups/regions of non-null bins, for example separated by at least one null bin. According to an embodiment of the present disclosure, calculator 40 can be arranged for processing each region of the histograms separately. In such case, calculator 40 aligns the histograms as detailed above and then compares each region separately consistently with what is detailed above for single region histograms. According to an embodiment of the present disclosure, the parameters of the density and height filters can be tuned separately for each type of region that is considered. For example, one set of parameters can be provided for higher sensitivity in a region of the histogram closer to the ground, and another set of parameters can be provided for lesser sensitivity in a higher region of the histogram.

According to an embodiment of the present disclosure, the various portions of the histograms can be aligned separately, for example by calculating the histogram range for each considered portion of the histogram. Processing separately the portions of the histograms can improve quality of detections in certain conditions like open areas covered by high trees. Otherwise in such cases the motion of the parts of the trees can overpower much smaller but important changes on the ground.

According to an embodiment of the present disclosure, after finishing the comparison processing of all cells, calculator 40 has produced a 2D grid, 74 or 74', wherein each cell is marked as having differences or not between the reference and current clouds of points 55', 55. According to an embodiment of the present disclosure, the adjacent cell with differences are grouped for reporting and displaying purpose. Each group can be reported as a separate cue as a list of all the cells it consists of. For the purpose of reducing the data, this reporting can also be limited by the contour cells only or just by the bounding box. This can be accomplished with a connected component analysis used in 2D image processing where the grid is represented as a binary image which has non-zero pixels corresponding to the cells with the detected changes.

Figure 7:
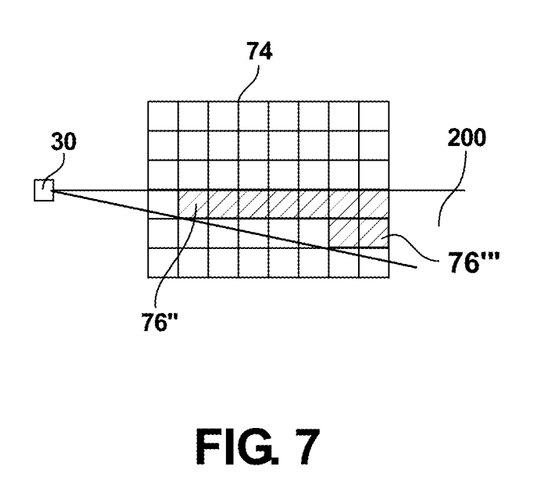
FIG. 7 illustrates a detail of the operation of the calculator of FIG. 1 for comparing corresponding volume cells of the first and second 3D clouds of points.

According to an embodiment of the present disclosure, calculator 40 is arranged for comparing in priority the sequence of lists associated to the 2-D grid cells 76', 76 proximal to the sensor apparatus; for marking the cells that comprise differences; and for marking as comprising no differences all the 2-D grid cells located entirely in a shadow zone of cells that comprise differences.

FIG. 7 illustrates a 2-D grid 74 obtained from a clouds of points 55 (not shown) obtained from the output of a sensor apparatus 30. According to an embodiment of the present disclosure, a shadow zone 200 is an area of the 2-D grid 74 that expands from a marked cell 76", away from the sensor apparatus 30 between two lines originating at the sensor apparatus 30 and being tangent with the marked cell 76". According to an embodiment of the present disclosure, calculator 40 marks all the cells 76"/completely comprised in shadow zone 200 as identical.

If more than two cells 76" are marked, calculator 40 marks as identical all the cells 76"/completely comprised in the shadow zone 200 formed by each of the marked cells 76".

According to an embodiment of the present disclosure, calculator 40 can alternatively mark as null all the lists comprised of points completely comprised in a 3-D shadow zone originating from sensor apparatus 30 and tangent to the horizontal and vertical boundaries of the non-null bins associated with cell 76". It is to be noted that, if the sensor apparatus is located at a height above the height of the top non-null bin associated with marked cell 76", then the shadow zone 200 will be of decreasing height from the sensor apparatus 30 and toward the ground.

According to an embodiment of the present disclosure, each marking of a cell comprises an appropriate flag specifying the reason for marking the cell. This information is available to an operator for further verification.

According to an embodiment of the present disclosure, calculator 40 can be provided for considering as null the lists of points located at a predetermined height above the ground, under the rationale that only changes taking place close to the ground are to be taken in account. A position of the ground with respect to clouds of points 55, 55' can for example be determined by pre-scanning the area from which clouds 55, 55' will be formed. Such pre-scanning can for example be conducted using scans from an airborne LIDAR along multiple flight paths. Cloud 55 can alternatively be used to determine the position of the ground.

According to an embodiment of the present disclosure, areas of the clouds of points 55, 55' can be prioritized so that the calculator 40 checks prioritized areas earlier or more frequently than the other areas, or have threshold parameters set so as to provide a more sensitive motion detection than the other areas.

Figure 8:
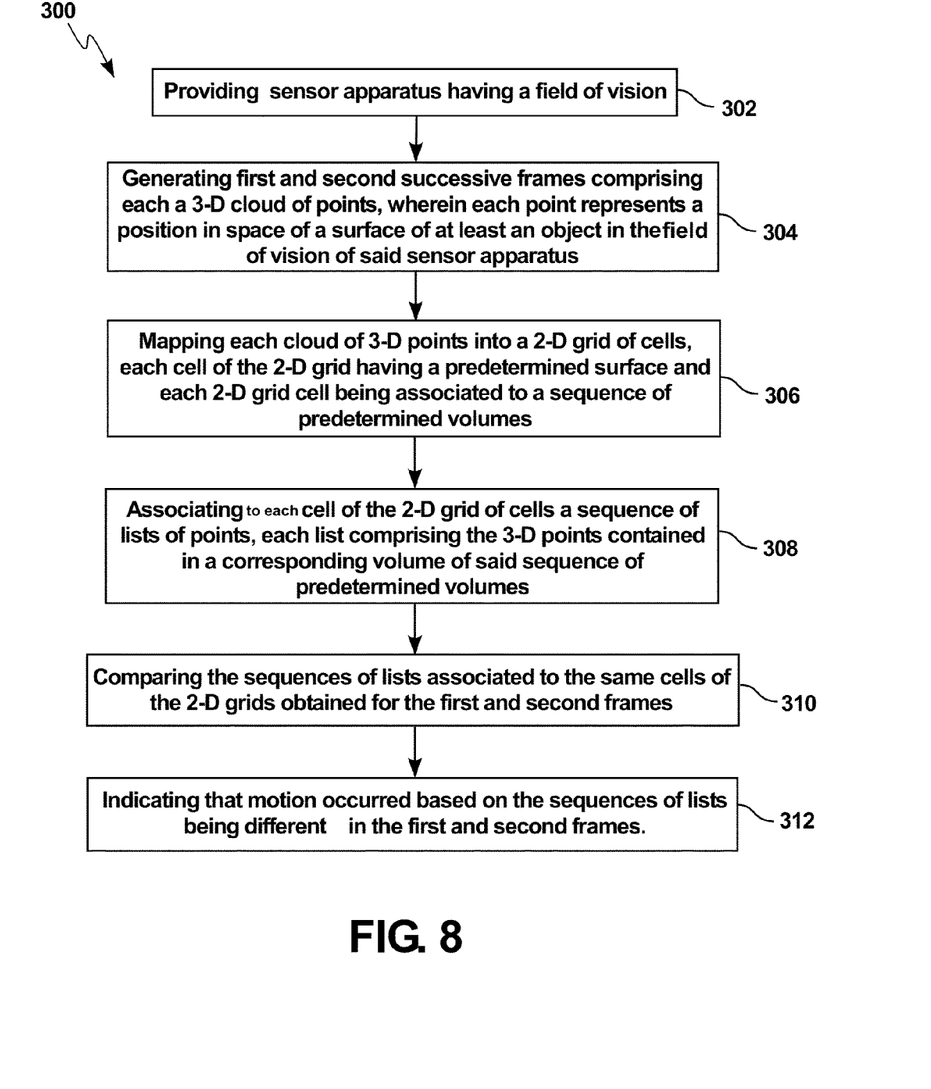
FIG. 8 illustrates a method of detection of a motion according to an embodiment of the present disclosure.

FIG. 8 illustrates a method 300 for detecting motion according to an embodiment of the present disclosure.

The method comprises providing 302 a sensor apparatus having a field of vision The method then comprises generating 304 first and second successive frames comprising each a 3-D cloud of points, wherein each point represents a position in space of a surface of at least an object in the field of vision of said sensor apparatus.

The method then comprises mapping 306 each cloud of 3-D points into a 2-D grid of cells, each cell of the 2-D grid having a predetermined surface and each 2-D grid cell being associated to a sequence of predetermined volumes.

The method then comprises associating 308 to each cell of the 2-D grid of cells a sequence of lists of points, each list comprising the 3-D points contained in a corresponding volume of said sequence of predetermined volumes.

The method then comprises comparing 310 the sequences of lists of points associated to the same cells of the 2-D grids obtained for the first and second frames.

The method then comprises indicating 312 that motion occurred based on the sequences of lists being different in the first and second frames.

Figure 9:
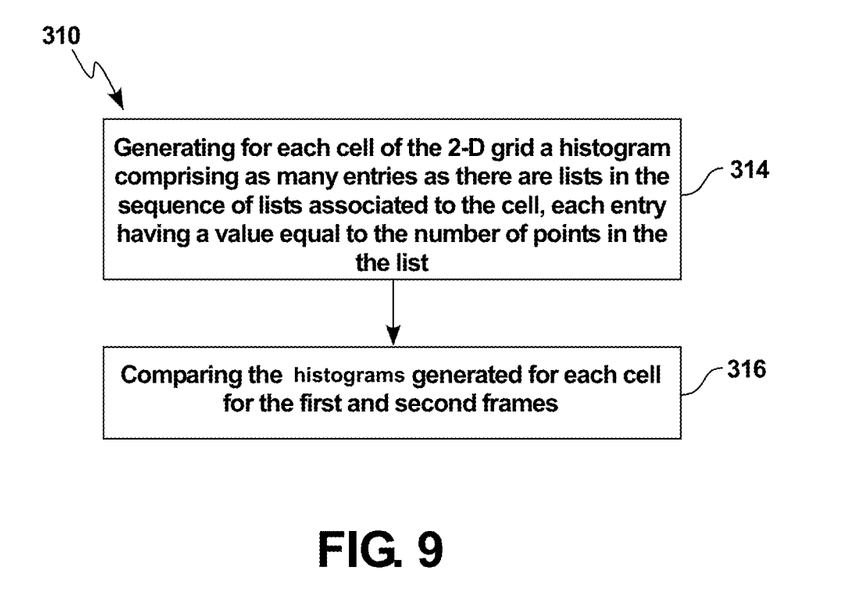
FIG. 9 illustrates a detail of the method of FIG. 8.

FIG. 9 illustrates a detail of method 300. According to an embodiment of the present disclosure, the step 310 of comparing the sequences of lists comprises generating 314 for each cell of the 2-D grid a histogram comprising as many entries as there are lists in the sequence of lists associated to the cell, each entry having a value equal to the number of points in the list; and comparing 316 the histograms generated for each cell for the first and second frames.

Generally, the present disclosure relates to a motion detector comprising a sensor apparatus and a calculator arranged for: generating first and second successive frames comprising each a 3-D cloud of points, wherein each point represents a position in space of a surface of at least an object in the field of vision of said sensor apparatus; transforming each of the first and second frames by: mapping each cloud of 3-D points into a 2-D grid of cells associated each to a sequence of predetermined volumes; and associating to each cell of the 2-D grid of cells a sequence of the lists of the points contained in corresponding volumes of the sequence of predetermined volumes; comparing the sequences of lists associated to the same cells of the 2-D grids obtained for the first and second frames; and indicating that motion occurred based on the sequence of lists being different in the first and second frames.

It should be understood that the above-described embodiments use a LIDAR sensor 30 as an exemplary source of the 3-D clouds of points, but the present disclosure provides for detecting differences in a sequence of 3-D cloud of points obtained any type of sensor, such as a ultrasound sensor, radar sensor, a sonar sensor, a RFID sensor, or obtained by any system capable of generating a 3-D cloud of point such as a cellular network, a computer network, etc. . . .

Embodiments of the present disclosure have the following advantages compared to the prior art: Embodiments of the present disclosure require significantly less computation power to do the processing because most of the processing is performed on the histograms instead of the points. Embodiments of the present disclosure find only important changes in the point clouds. Embodiments of the present disclosure are suitable for base/camp protection. Embodiments of the present disclosure handle sparse and dense point clouds Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:

1. A motion detector comprising:
   a sensor apparatus having a field of vision; and
   a calculator arranged for:
   generating first and second successive frames each comprising a 3-D cloud of points, wherein each point represents a position in space of a surface of at least an object in the field of vision of said sensor apparatus;
   transforming each of the first and second frames by:
   mapping each cloud of 3-D points into a 2-D grid of cells, each cell of the 2-D grid having a predetermined surface and each 2-D grid cell being associated to a sequence of predetermined volumes; and
   associating to each cell of the 2-D grid of cells a sequence of lists of points, each list comprising the 3-D points contained in a corresponding volume of said sequence of predetermined volumes;

comparing the sequences of lists associated to the same
cells of the 2-D grids obtained for the first and second
frames; and indicating that motion occurred based on the sequence of
lists being different in the first and second frames.

2. The motion detector of claim 1, wherein said calculator is arranged for comparing the sequences of lists associated to the same cells of the 2-D grids obtained for the first and second frames by:
generating for each cell of the 2-D grid a histogram comprising as many entries as there are lists in the sequence of lists associated to the cell, each entry being the number of points in the list; and
comparing the histograms generated for each cell for the first and second frames.

3. The motion detector of claim 2, wherein the calculator is arranged for comparing the histograms by calculating a distance between the histograms, the sequences of lists associated to the same cells of the 2-D grids obtained for the first and second frames being different if the distance between their histograms is greater than a predetermined threshold.

4. The motion detector of claim 3, wherein the calculator is arranged for marking the cells of the first and second 2-D grids having histograms distant by more than said predetermined threshold.

5. The motion detector of claim 1, wherein:
the calculator is arranged for comparing in priority the sequence of lists associated to the 2-D grid cells proximal to the sensor apparatus;
the calculator is arranged for marking the cells of the first and second 2-D grids having different sequence of lists for the first and second frames; and
the calculator is arranged for considering as identical the sequences of lists associated to the 2-D grid cells located in a shadow zone of any marked cell, the shadow zone comprising an area of the 2-D grid expanding from the marked cell, away from the sensor apparatus, between two lines originating at the sensor apparatus and being tangent with the marked cell.

6. The motion detector of claim 1, wherein the calculator is arranged for displaying one of the first and second frames with a highlighting of the points of the lists that differ from the corresponding lists in the other frame.

7. The motion detector of claim 1, wherein the calculator is arranged for considering two compared sequences of lists as identical if each of the compared sequences of lists comprises less than a first predetermined minimum number of points.

8. The motion detector of claim 1, wherein the calculator is arranged for considering two compared sequences of lists as identical if:
at least one of the compared sequences of lists comprises less than a second predetermined minimum number of points; and
the largest of the compared sequence of lists comprises less than a third predetermined minimum number of points.

9. The motion detector of claim 1, wherein the calculator is arranged for considering a sequence of lists associated to a cell of the 2-D grid of cells as empty if at least a predetermined number of the lists comprise each less points than a fourth predetermined minimum number of points.

10. The motion detector of claim 1, wherein the calculator is arranged for considering a sequence of lists associated to a cell of the 2-D grid of cells as empty if the sequence comprises less than a predetermined minimum number of consecutive non-empty lists.

11. The motion detector of claim 1, wherein said predetermined volumes associated to a 2-D grid cell are all located below a predetermined height over said cell.

12. The motion detector of claim 11, wherein a height of a ground surface in the field of view of the sensor is known for each cell of the 2-D grid, and wherein said predetermined height defines a predetermined space above said ground plane.

13. The motion detector of claim 1, wherein the sensor apparatus is one of a LIDAR sensor, an ultrasound sensor, a radar sensor, a sonar sensor and an RFID sensor.

14. A method for detecting motion, the method comprising:
providing a sensor apparatus having a field of vision;
generating first and second successive frames comprising each a 3-D cloud of points, wherein each point represents a position in space of a surface of at least an object in the field of vision of said sensor apparatus;
transforming each of the first and second frames by:
mapping each cloud of 3-D points into a 2-D grid of cells, each cell of the 2-D grid having a predetermined surface and each 2-D grid cell being associated to a sequence of predetermined volumes; and
associating to each cell of the 2-D grid of cells a sequence of lists of points, each list comprising the 3-D points contained in a corresponding volume of said sequence of predetermined volumes;
comparing the sequences of lists associated to the same cells of the 2-D grids obtained for the first and second frames; and
indicating that motion occurred based on the sequences of lists being different in the first and second frames.

15. The method of claim 14, wherein said comparing the sequences of lists associated to the same cells of the 2-D grids obtained for the first and second frames comprises:
generating for each cell of the 2-D grid a histogram comprising as many entries as there are lists in the sequence of lists associated to the cell, each entry being the number of points in the list; and
comparing the histograms generated for each cell for the first and second frames.

16. The method of claim 15, wherein comparing the histograms comprises calculating a distance between the histograms, the sequences of lists associated to the same cells of the 2-D grids obtained for the first and second frames being different if the distance between their histograms is greater than a predetermined threshold.

17. The method of claim 16, wherein indicating that motion occurred based on the lists of points being different in the first and second frames comprises marking the cells of the first and second 2-D grids having histograms distant by more than said predetermined threshold.

18. The method of claim 14, wherein:
said comparing comprises comparing in priority the sequence of lists associated to the 2-D grid cells proximal to the sensor apparatus;
the method comprising: marking the cells of the first and second 2-D grids having different sequence of lists for the first and second frames; and
considering as identical the sequences of lists associated to the 2-D grid cells located in a shadow zone of any marked cell, the shadow zone comprising an area of the 2-D grid expanding from the marked cell, away from the sensor apparatus, between two lines originating at the sensor apparatus and being tangent with the marked cell.

19. The method of claim 14, wherein said indicating that motion occurred based on the sequence of lists being different in the first and second frames comprises displaying one of the first and second frames with a highlighting of the points of the lists that differ from the corresponding lists in the other frame.

20. The method of claim 14, wherein said comparing the sequences of lists associated to the same cells of the 2-D grids obtained for the first and second frames comprises:
considering two compared sequences of lists as identical if each of the compared sequences of lists comprises less than a first predetermined minimum number of points.

21. The method of claim 14, wherein said comparing the sequences of lists associated to the same cells of the 2-D grids obtained for the first and second frames comprises:
considering two compared sequences of lists as identical if:
at least one of the compared sequences of lists comprises less than a second predetermined minimum number of points; and
the largest of the compared sequence of lists comprises less than a third predetermined minimum number of points.

22. The method of claim 14, wherein said comparing the sequences of lists associated to the same cells of the 2-D grids obtained for the first and second frames comprises:
considering a sequence of lists associated to a cell of the 2-D grid of cells as empty if at least a predetermined number of the lists comprise each less points than a fourth predetermined minimum number of points.

23. The method of claim 14, wherein said comparing the lists of points associated to the same cells of the 2-D grids obtained for the first and second frames comprises:
considering a sequence of lists associated to a cell of the 2-D grid of cells as empty if the sequence comprises less than a predetermined minimum number of consecutive non-empty lists.

24. The method of claim 14, wherein said predetermined volumes associated to a 2-D grid cell are all located below a predetermined height over said cell.

25. The method of claim 24, wherein a height of a ground surface is known for each cell of the 2-D grid, and said predetermined height defines a predetermined space above said ground plane.

26. The method of claim 14, wherein the sensor apparatus is one of a LIDAR sensor, art ultrasound sensor, a radar sensor, a sonar sensor and an RFID sensor.

27. A non-transitory computer medium storing computer instructions which, when executed by a computer, cause the computer to:
receive, from a sensor apparatus having a field of vision, first and second successive frames comprising each a 3-D cloud of points, wherein each point represents a position in space of a surface of at least art object in the field of vision of said sensor apparatus;
transform each of the first and second frames by:
mapping each cloud of 3-D points into a 2-D grid of cells, each cell of the 2-D grid having a predetermined surface and each 2-D grid cell being associated to a sequence of predetermined volumes; and
associating to each cell of the 2-D grid of cells a sequence of lists of points, each list comprising the 3-D points contained in a corresponding volume of said sequence of predetermined volumes;
compare the lists of points associated to the same cells of the 2-D grids obtained for the first and second frames; and
indicate that motion occurred based on the lists of points being different in the first and second frames.

28. The non-transitory computer medium of claim 27, wherein said comparing the lists of points associated to the same cells of the 2-D grids obtained for the first and second frames comprises:
generating for each cell of the 2-D grid a histogram comprising as many entries as there are lists in the sequence of lists associated to the cell, each entry being the number of points in the list; and
comparing the histograms generated for each cell for the first and second frames.

* * * * *